UNITED STATES PATENT OFFICE.

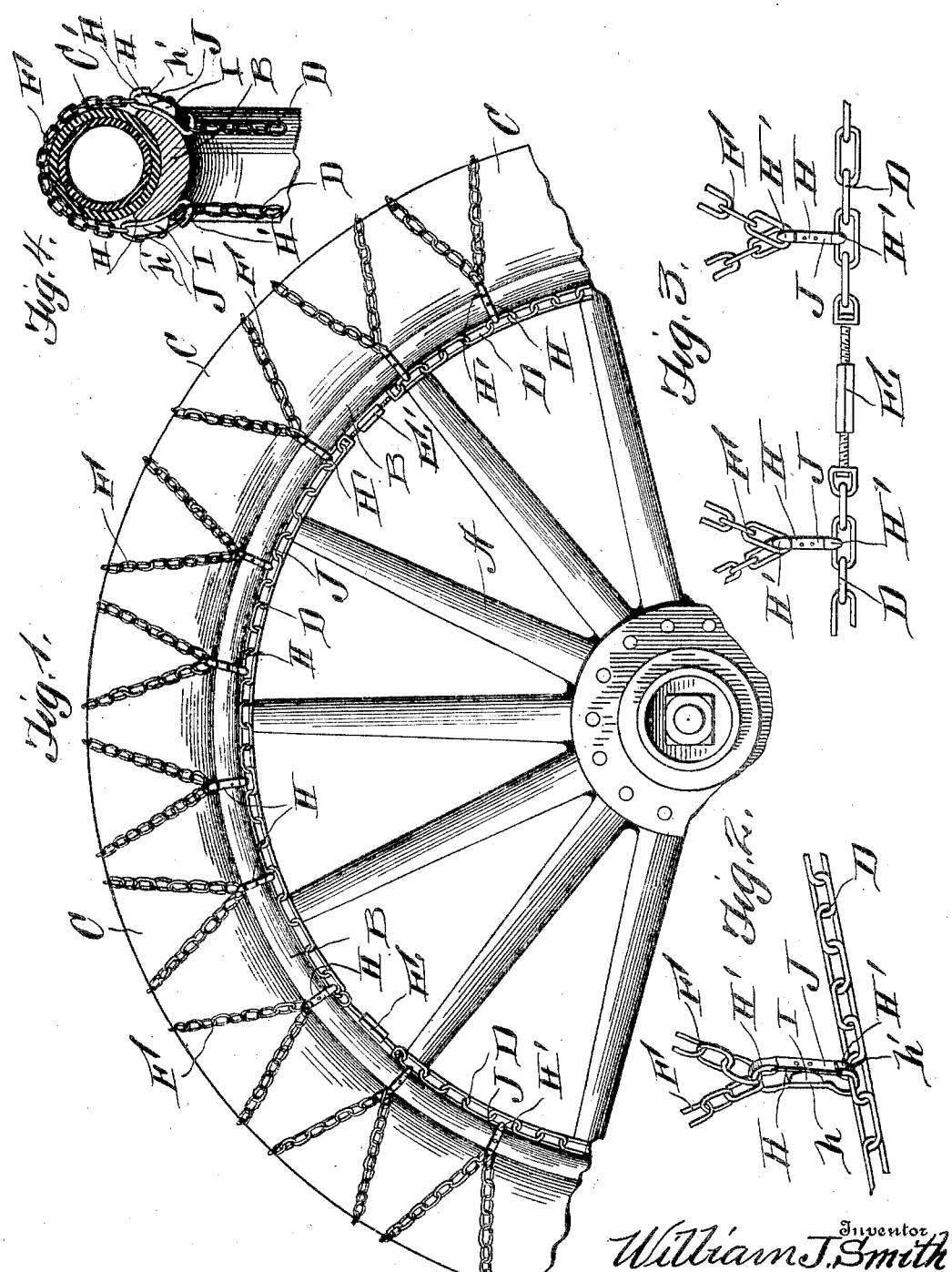

WILLIAM J. SMITH, OF CANASTOTA, NEW YORK.

ANTISLIPPING ATTACHMENT FOR VEHICLE-TIRES.

No. 797,757.        Specification of Letters Patent.        Patented Aug. 22, 1905.

Application filed April 18, 1905. Serial No. 256,188.

*To all whom it may concern:*

Be it known that I, WILLIAM J. SMITH, a citizen of the United States, residing at Canastota, in the county of Madison and State of New York, have invented certain new and useful Improvements in Antislipping Attachments for Vehicle-Tires; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in antislipping attachments for tires of vehicle-wheels, and especially adapted for use upon pneumatic or cushion tires, and comprises a chain which takes a zigzag course upon the circumference of the tire and anchored at intervals by means of doubled-ended snap-hooks to a cable or chain passing adjacent to the rim of a wheel, suitable means being provided for drawing and holding the chain taut.

The invention consists, further, in various details of construction and in combinations and arrangements of parts, which will be hereinafter fully described and then specifically defined in the appended claim.

My invention is illustrated in the accompanying drawings, which, with the letters of refence marked thereon, form a part of this application, and in which drawings—

Figure 1 is a side elevation of a portion of a wheel, showing my antislipping attachment applied thereto. Fig. 2 is an enlarged detail view showing the manner in which the zigzag chain is held to a cable or chain by means of double-ended snap-hooks. Fig. 3 is a detail view of the tightening-chain; and Fig. 4 is a detail view showing the manner in which the snap-hook engages the rim of the wheel.

Reference now being had to the drawings by letter, A designates a wheel having a rim B of the usual construction, and C is a tire either pneumatic or otherwise.

D designates a chain made up of links, with turnbuckles E, positioned at intervals, connecting the sections of said chain, whereby a more efficient means is provided for tightening the chain or a cable, if the latter is substituted for the chain.

F designates a chain which is positioned zigzag over the tread-surface of the tire and is connected at intervals with the chain D by means of double-ended snap-hooks H. Said snap-hooks are made each of a piece of metal bent to form hooks H', while the shank portion of each hook is concaved, as at $h$, and adapted to conform to the contour of the tire upon the rim of the wheel, as shown in Fig. 4 of the drawings. A block I is fastened to the central portion of the snap-hook and to which is secured a leaf-spring J, the free ends of which are adapted to be seated upon shoulders $h'$ of the hooks H'.

In applying my antislipping attachment to wheels the inner ends of the snap-hooks are caught into links of the chain D, there being two of said chains D, one positioned upon each side of the wheel and in a similar manner, as illustrated in Fig. 1. The chain F is run zigzag over the surface of the tire, being made to engage alternate snap-hooks upon opposite sides of the wheel, and when the chain has been run about the entire circumference of the wheel the turnbuckles E may be operated to draw the chain F taut against the surface of the tire.

It will be observed by the provision of the antislipping device, as shown and described, the same may be readily applied to a tire while it is in an inflated or deflated condition, and owing to the simplicity of construction of the attachment the same may be easily and quickly applied to or detached from a vehicle-wheel.

While I have shown a chain which is positioned adjacent to the rim of the wheel and to which the zigzag chain is connected by means of snap-hooks, it will be understood that a cable may be substituted, if desired, for the chain, which is adapted to draw upon the snap-hooks to hold the chain upon the surface of the tire taut, and it will also be understood that I may vary the detailed construction of the invention, if desired, to meet different conditions without in any way departing from the spirit of the invention.

Having thus fully described my invention, what I claim as new, and desire to secure by Letters Patent, is—

An antislipping device for tires comprising, in combination with the rim of a wheel and tire thereon, a chain adapted to be held against the rim and provided with turnbuckles drawing the links of the chain taut, a series of double-ended snap-hooks, engaging, with their inner ends, links of said chain, and having a concaved portion adapted to conform to the convexed surface of the rim of the wheel, and a chain arranged in a zigzag direction over the tread-surface of the tire and engaging the outer ends of said snap-hooks at the marginal edge of said tire, as set forth.

In testimony whereof I hereunto affix my signature in presence of two witnesses.

WILLIAM J. SMITH.

Witnesses:
 CHAS. W. WORDEN,
 FRED U. FISH.